May 21, 1940.    F. L. MOSELEY    2,201,559
EARTH INDUCTION COMPASS
Filed May 12, 1937
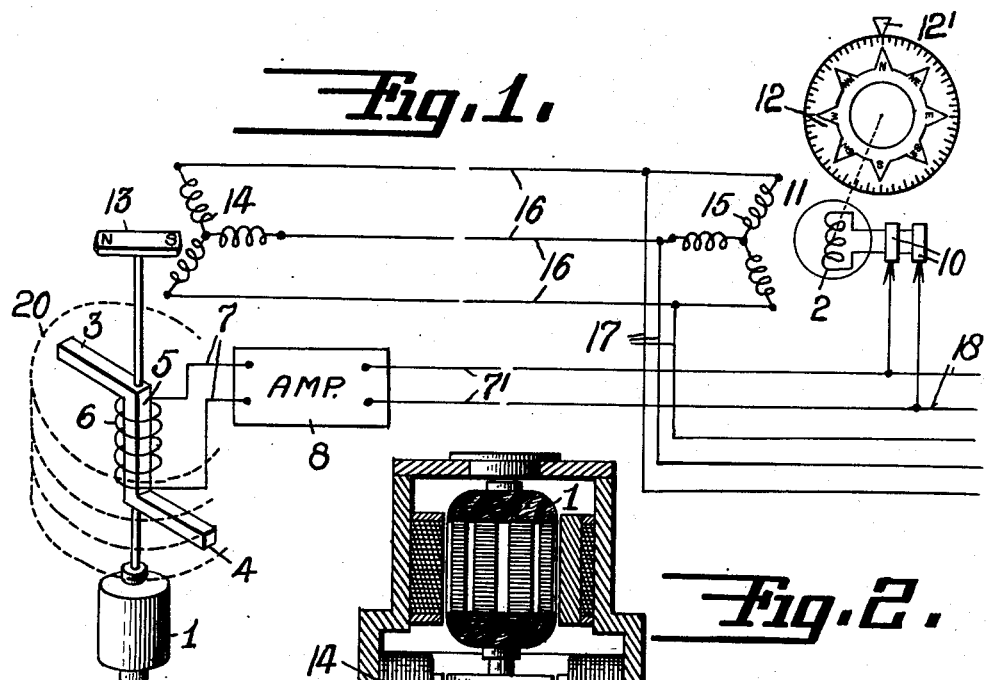
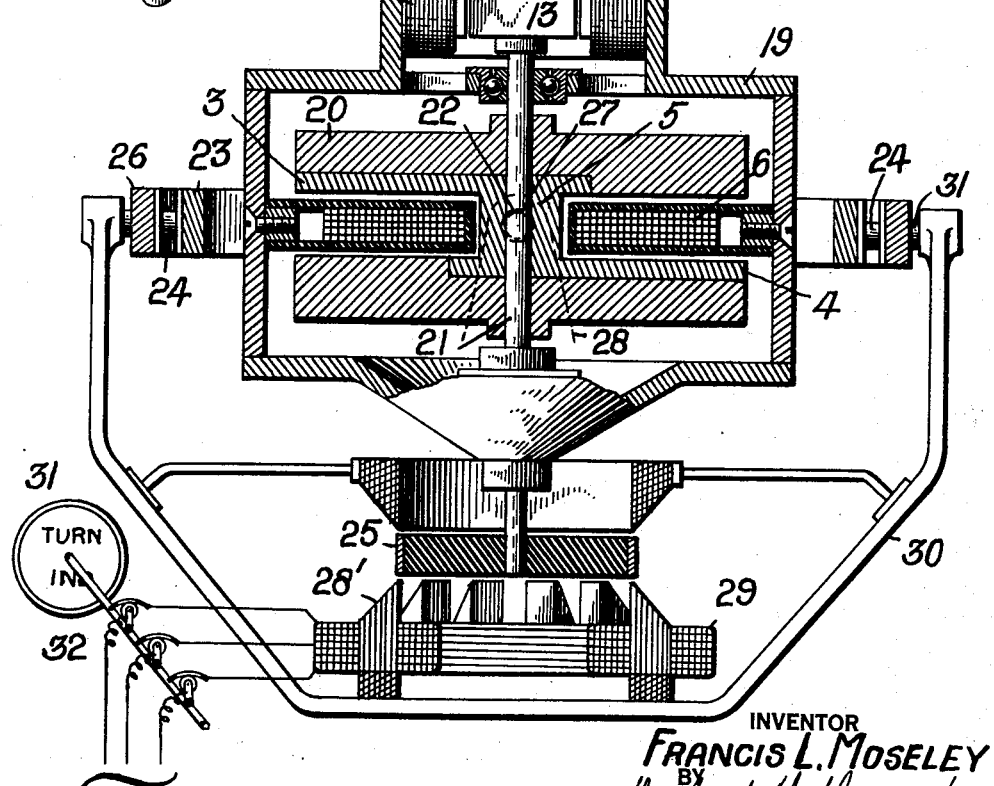
INVENTOR
FRANCIS L. MOSELEY
BY
Herbert H. Thompson
HIS ATTORNEY

UNITED STATES PATENT OFFICE 2,201,559

EARTH INDUCTION COMPASS

Francis L. Moseley, Pelham, N. Y., assignor to Sperry Gyroscope Company, Inc., Brooklyn, N. Y., a corporation of New York Application May 12, 1937, Serial No. 142,313

3 Claims. (Cl. 33—204)

This invention relates, generally, to navigation instruments and the invention has reference, more particularly, to a novel earth inductor compass especially suitable for use on aircraft, although the same is also adapted for use on other craft, such as ships.

The earth induction compass as heretofore generally constructed is not a true compass, but merely indicates deviation from course by the deflection of a galvanometer needle to the right or left. In the copending application of George P. Bentley, now Patent 2,176,197, dated October 17, 1939, for Earth inductor compass, there is disclosed a stabilized 360° indicating earth inductor compass having a compass card on the rotor of the compass and employing a stroboscopic lamp operated to intermittently illuminate the compass card in synchronism with rotor speed.

The principal object of the present invention is to provide a novel earth induction compass employing A. C. generating means in conjunction with the compass and operating at the speed of the compass rotor, the output of which generating means is compared in phase with the A. C. output of the compass and any variation in phase of these outputs, corresponding to the angular turning of the craft, is employed to operate a compass card that serves to give the correct heading of the craft throughout 360° of arc.

Another object of the present invention lies in the provision of a novel earth induction compass of the above character having transmission means adapted for operating one or a plurality of compass cards located either adjacent or remote from the earth induction compass proper, whereby the compass of this invention is adapted for operating any desired number of repeater compasses located at convenient points throughout the craft.

Still another object of the present invention is to provide an earth induction compass of the above character that is stabilized, whereby the same is not adversely affected by the vertical component of the earth's field during maneuvers, as when making turns in aircraft, the said stabilized compass having means for automatically erecting the same with provision for removing the erecting force during turns, if desired.

Other objects and advantages will become apparent from the specification, taken in connection with the accompanying drawing wherein the invention is embodied in concrete form.

In the drawing,

Fig. 1 is a wiring diagram of the novel earth induction compass of this invention.

Fig. 2 is a vertical sectional view of the compass proper, but not including the compass card nor its operating motor.

Similar characters of reference are used in the above figures to indicate corresponding parts.

Referring now to Fig. 1 of the drawing, the reference numeral 1 designates a motor connected for rotating a bar of magnetic conducting material of approximately Z shape, having upper and lower horizontal oppositely radiating arms 10 and a vertical main or connecting portion 5. As this bar rotates, its arms 3 and 4 are alternately directed north so that an alternating flux is produced in the vertical central portion 5, thereby inducing an A. C. in the surrounding stationary coil 6 that has a frequency corresponding to that of rotation of bar 5.

The output of coil 6 is supplied through leads 7 to an amplifier 8, the output of which is supplied through leads 7' and slip rings 10 to the single phase rotor 2 of a synchronous motor 11 of the "selsyn" type. This rotor 2 is connected to turn a compass card 12 with respect to a lubber mark 12'. Card 12 may be located at any convenient point either adjacent the motor 1 and rotating bar 5 or remote therefrom, the relatively low frequency output of coil 6 and amplifier 8 being suitable for conduction over either short or long leads to any point or points desired on the craft.

An armature 13 is mechanically coupled to rotate with bar 5. This armature is illustrated as a permanent magnet, although the same may be electrically excited, if desired. Armature 13 rotates inside of a three phase stator or field winding 14 and generates therein three phase current having the same frequency as the single phase current generated in the coil 6 around the rotating bar 5. The three phase winding 14 is similar to the three phase stator 15 of the motor 11, and the terminals of winding 14 are connected by leads 16 to the winding 15, thereby producing in stator 15 a magnetic field rotating at the same speed as armature 13.

Since rotor 2 of motor 11 is supplied with current of the same frequency as that supplied to stator 15, this rotor assumes and maintains a definite mechanical position within stator 15, the rotor 2 lining up its major flux axis with the instantaneous resultant field position of stator 15, so that card 12, connected to rotor 2, is caused to indicate magnetic north. As the craft carrying the earth induction compass turns in azimuth, the phase position of the voltage generated in coil 6 is correspondingly changed, causing a corresponding change in the phase of the voltage in rotor 2 with respect to stator 15, i. e., the flux in rotor 2 rises to its maximum at a different time so that this rotor is caused to turn to realign itself with a new instantaneous position of the rotating field in stator 15. This action is entirely automatic and continuous and operates to maintain the card 12 in synchronous alignment with the earth's magnetic field.

In the event that it is desired to operate one or more repeater compasses, leads 17 and 18 may be taken off leads 16 and 7' for the purpose of supplying motors or repeater "selsyns" similar to motor 11, which repeater motors operate additional compass cards in desired locations.

In Fig. 2 a typical construction of the generating portion of the induction compass of this invention is illustrated. In this figure, 19 designates a non-magnetic bearing casing having a spool shaped gyroscope rotor 20 of brass or other non-magnetic material fixed on a shaft 21 rotatable within said casing about a vertical axis, the said gyro rotor 20 being illustrated as electrically driven through use of electric motor 1, which may be of the type shown and claimed in the application of O. E. Esval, Ser. No. 121,962, filed January 23, 1937, for High speed A. C. driven gyroscopes. The bar 5 is shown incorporated in the rotor 20 so as to constitute a part thereof, and coil 6 is carried by casing 19 so as to surround the vertical portion of the bar 5. The armature 13 is fixed on shaft 21, while three phase stator 14 is carried by casing 19.

The casing 19 is universally mounted about horizontal axes by providing the rotor bearing casing with horizontal pivots, of which one is shown at 22, rotatably mounted preferably by means of anti-friction bearings in a gimbal ring 23 which, in turn, is similarly mounted for oscillation or turning about horizontal pivots 24 at right angles to pivots 22. The casing 19 is preferably substantially balanced about both horizontal axes, i. e., the center of gravity of casing 19 and its contents, together with a supported inductor ring 25, lies preferably substantially at the point of intersection of axes passing through pivots 22 and 24. A slight amount of pendulousness may be employed to correct errors due to friction in the trunnions, but considerable pendulosity of the gyro is undesirable, particularly where the device is to be used on aircraft, since in operation during turning or other maneuvering of the craft giving rise to acceleration forces, an oscillation of the gyro pendulum is apt to be set up, which is obviously undesirable.

Pivots 24 are carried by a gimbal ring 26 that, in turn, is pivotally mounted by pivots 27 on standards 28 forming a part of the frame of the instrument, the axis of pivots 27 being coincident with that of pivots 22. A laminated stator ring 28' having a three phase winding 29 is carried by a U-shaped frame member 30 that depends from ring 26, being pivoted on pivots 31 aligned with pivots 24. Winding 29 cooperates with inductor 25 to precess the gyro rotor 20 to the vertical in the event that the gyro should become displaced therefrom, as disclosed and claimed in the copending application of O. E. Esval et al., Ser. No. 64,004, filed February 15, 1936, for Electromagnetic erecting means for gyroscopes.

Inasmuch as the pendulous frame member 30 is apt to swing from the vertical during turning of the craft and, hence, tend to precess the gyro rotor from the vertical, the current for winding 29 may be shut off during turns if desired, the same being accomplished through use of a turn indicator 31 that is employed for operating an on and off switch 32 included in the three phase supply to winding 29.

Since the bar 5 is continuously stabilized by the gyro rotor 20 so as to rotate continuously about a vertical axis regardless of the maneuvering of the craft upon which the compass is installed, the output of coil 6 is not influenced by the vertical component of the earth's field, so that the compass card 12 is accurate and dead beat at all times, thereby rendering the compass of this invention particularly valuable on aircraft.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In an earth inductor compass having a remote repeater compass card, a rotor bearing frame, an earth inductor rotor, a gyro rotor and a generator rotor, all on one shaft journaled in said frame and all forming part of the mass of the gyro rotor, means for spinning said gyro rotor shaft and its rotors, means for universally suspending the entire rotor bearing frame and its contained rotors in neutral equilibrium, means for automatically erecting said frame and its rotors to an average vertical spin axis, stationary electric winding means on said frame having alternating current impulses generated in them by said earth inductor rotor, a second stationary winding means in said frame having alternating current impulses generated in them by said generator rotor, remote phase angle differential coils which continuously and automatically position themselves at an angle equal to the phase angle differences between said alternating current impulses, and a repeater compass card turned by one of said coils indicating the ship's bearing with respect to north.

2. In an earth inductor compass for vehicles, the combination with a non-pendulous, self-erected gyro vertical, having three degrees of freedom, of means to automatically and continuously measure the angle between the direction of the horizontal component of the earth's magnetic field and the vector of an alternating magnetic field fixed to the vehicle at the moment when said field reaches a predetermined value to thereby furnish a ship's course indicator or repeater compass, said means consisting of two independent generators the rotors of which are integral with the gyro rotor of said gyro-vertical and the field of one of which is formed by the earth's field, both generators having stationary windings only, common means for synchronously rotating said generators, a separate ship's course indicator, and windings in said indicator excited respectively by the currents generated by said two generators, and circuit connections between said generators and indicator for actuating the indicator in accordance with the phase angle difference between said generated currents, thereby showing the vehicle's heading.

3. In an earth inductor compass, a universally suspended frame which together with its contained parts is mounted in substantially neutral equilibrium, a shaft journaled therein on a normally vertical spin axis, a driving motor for said shaft mounted in said frame and having its armature on said shaft, a generator employing the earth's magnetic field for producing a single phase A. C. potential, the rotor of said generator being also mounted on said shaft, a second generator also having its rotor on said shaft and its stator in said frame, said stator forming a field independent of the earth's field and producing a three phase A. C. potential, all of said rotors forming a vertical shaft gyro rotor of a universally suspended gyroscope, an erecting means for said gyroscope mounted in said frame, a remote repeater compass card, and motive means for turning said card, said motive means having its stator supplied from one of said A. C. potentials and the rotor supplied from the other.

FRANCIS L. MOSELEY.